April 19, 1966 R. M. MAYER 3,247,466
POWER CONVERTER WITH RELAXATION OSCILLATOR STARTING CIRCUIT
Filed April 9, 1963
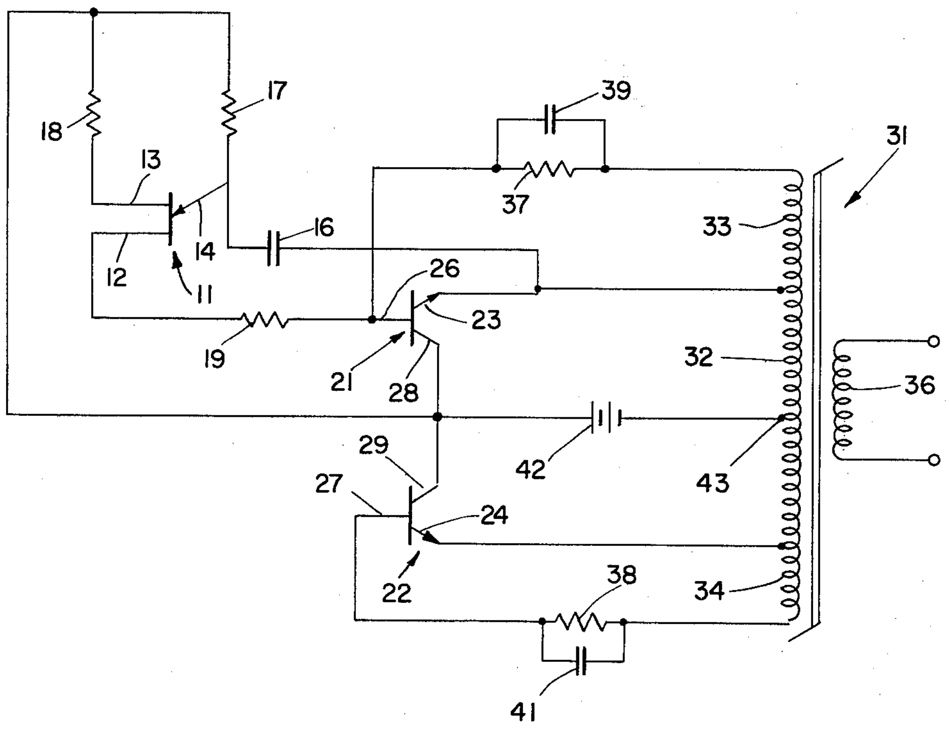
INVENTOR.
RICHARD M. MAYER
BY
Philip J McFarland
ATTORNEY 3,247,466
Patented Apr. 19, 1966

3,247,466

POWER CONVERTER WITH RELAXATION OSCILLATOR STARTING CIRCUIT

Richard M. Mayer, Somerville, Mass., assignor to Laboratory for Electronics, Inc., Boston, Mass., a corporation of Delaware Filed Apr. 9, 1963, Ser. No. 271,775
1 Claim. (Cl. 331—52)

This invention relates generally to multivibrator type power converters and more particularly it concerns a starting device for triggering a converter into oscillation. With the advent, of relatively inexpensive power transistors, it has become common practice to convert a direct current source of low voltage into a higher voltage source by means of an electronic oscillator. A transistor multivibrator circuit is particularly well suited for this application because of its relatively high power handling capabilities and simplicity of design.

The usual scheme employed to induce oscillation in a converter is to apply a high bias current to one or both of the bistable circuits employed in the converter. At the very least, this scheme requires the use of a switching device of some kind to establish the bias, together with means to sense when oscillation has begun so that the bias can be removed. A basic shortcoming of this scheme is that it does not provide for the effect of a short circuit load condition. As a result, the power handling capabilities of the bistable elements in the converter may and often are exceeded if the short circuit continues for any length of time because of the high value of quiescent current that is present.

This problem is overcome in the starting device according to the present invention which is adapted to produce periodic pulses of current to start the multivibrator oscillating. These pulses are of relatively short duration so that the average power dissipation in the converter while pulsing is taking place is relatively low. Also these pulses recur at a relatively low frequency in comparison with that of the multivibrator so that once the multivibrator is triggered into oscillation, it prevents further starting pulses from being generated.

To obtain this kind of pulsing action with a minimum of added circuit complexity, a relaxation oscillator embodying a unijunction transistor is used as the starting device. The pronounced negative resistance characteristic and attendant high current handling capacity of the transistor makes it possible to generate sharp pulses for starting purposes without the need for additional pulse shaping components such as transformers. Also the low voltage requirements of the unijunction transistor permit the use of the same power supply for the starting device as for the most common type of multivibrator-converter for which the starting device is specially well suited.

The general object of the invention, therefore, is to provide an improved starting device for a multivibrator power converter.

A more specific object is to provide a starting device which offers protection against a short circuit load condition while nevertheless being capable of producing oscillations once this condition is removed.

Still another object is to provide a starting device for a transistor power converter which uses a minimum of additional components.

The novel features of the invention together with further objects and advantages thereof will become more readily apparent from the following detailed description of a preferred embodiment as illustrated in the accompanying drawing. In the drawing, the starting device according to the invention is illustrated schematically.

With reference now to the drawing it will be observed that the numeral 11 designates a unijunction transistor having two base electrodes 12 and 13, and an emitter electrode 14. This type of transistor, as is well known, is generally comprised of a bar of semi-conductor material of one conductivity type which has, intermediate its ends, a region of opposite conductivity type arranged to form a rectifying junction. External connection to the junction is provided by way of emitter electrode 14, while base electrodes 12 and 13 provide a means for making an ohmic connection to the bar in the vicinity of its ends. With an operating potential applied between the base terminals, but in the absence of an appreciable emitter potential, the emitter is effectively back biased and practically no current flows through the junction. However, when the potential of the emitter reaches a critical value, determined by the physical characteristics of the transistor, an appreciable current begins to flow between emitter electrode 14 and base electrode 12 which has the effect of lowering the resistance between these terminals. Thus, the current tends to increase without a further increase in voltage, or to put it another way, the amount of emitter potential required to sustain the particular current becomes increasingly less until saturation occurs.

According to the invention, this characteristic is availed of through the use of the unijunction transistor as a relaxation oscillator. To this end, there is provided a capacitor 16 which is charged to the required critical potential value through a resistor 17. Also provided is a resistor 18 for compensating the effect of temperature changes on the unijunction transistor. Resistor 19, which is disposed in the output circuit of the relaxation oscillator serves to limit the peak value of the current pulses which are produced by the unijunction transistor.

The converter itself is seen to consist of a pair of transistors 21 and 22 having emitter terminals 23, 24, base terminals 26, 27 and collector terminals 28, 29. Intercoupling the emitter base and emitter-collector circuits of the transistors is a saturable transformer 31 having a center tapped primary winding 32 and a pair of feedback windings 33 and 34. The secondary of the transformer to which are connected the output terminals of the converter is designated 36.

The specific manner in which the transformer and the converter transistors are connected is as follows. Emitter terminals 23, 24 are connected to the ends of the primary winding 32 while base terminals 26, 27 are coupled to the remote ends of the feedback windings. Included in the feedback circuits are a pair of current limiting resistors 37 and 38, and across these resistors are a pair of speed up capacitors 39 and 41. The opposite ends of feedback windings 33 and 34 are connected to the ends of the primary winding in common with the emitter terminals 23 and 24 while collectors 28 and 29 are connected in common with the positive side of a direct voltage source 42. The negative side of the source is connected to the center tap 43 on the primary winding 32.

To energize the base-to-base circuit of the unijunction transistor, resistor 18 has one of its ends connected to the positive side of the voltage source 42, and resistor 19 provides a current path leading directly from the base electrode 12 of unijunction transistor 11 to the base terminal 26 of transistor 21. Capacitor 16 associated with the control circuit of the unijunction is connected between the emitter electrode 14 and emitter terminal 23. Resistor 17 through which the capacitor 16 charges, is connected in common with resistor 18 to the positive side of voltage source 42.

In operation the frequency at which the relaxation oscillator operates is determined primarily by the values of resistor 17 and capacitor 16. A frequency of 1 to 5 cycles per second has been found to work out well in actual practice. The frequency of the multivibrator converter, on the other hand, is determined primarily by the impedance characteristics of the transformer 31, a frequency in the 2,000 to 4,000 cycle per second range being the most common that is employed. This substantial difference in the frequencies at which the relaxation oscillator and the converter oscillate is important once the converter has been triggered into oscillation as will become apparent.

To induce oscillations in the first instance, capacitor 16 is charged by current in the circuit including resistor 17 and the portion of the primary winding which is connected in the emitter-collector circuit of transistor 21. When the charge on capacitor 16 builds up to the critical value necessary to create current flow in the unijunction transistor, which value is in the neighborhood of 14 volts in the illustrated example, capacitor 16 discharges through the resistor 19, thereby producing a pulse of current in the emitter-base circuit of the transistor 21. Under ordinary circumstances, this current pulse will produce an output current in the upper half of the primary winding 32, that is the portion connected between the negative side of the voltage source 42 and emitter terminal 23, which, in turn, will induce a voltage across feedback winding 33. As a consequence, more current will be caused to flow in the emitter-base circuit of transistor 21 tending to increase still further the amount of output current in the primary winding. This current buildup will continue until the core of the transformer 31 becomes saturated.

At this point, the flux in the core collapses, with the result that a voltage of opposite polarity is induced in the feedback winding 34 causing current to flow in the emitter-base circuit of transistor 22. This turns on transistor 22 which energizes the portion of the primary winding connected between the negative side of the source 42 and emitter terminal 24. With this portion of the primary winding energized, still more voltage is induced in the feedback winding 34 so that current in transistor 22 builds up and saturates the core in the opposite direction. When this occurs, the flux collapses once more and transistor 21 is once again caused to conduct. Under normal operating conditions, alternate conduction, that is oscillation, continues until the source voltage is removed. By virtue of the fact that capacitors 39 and 41 permit an initial high value of feedback current to flow in the emitter-base circuit of the converter transistors, the current limiting action of resistors 37 and 38 has little effect upon the frequency operation.

Once the converter has begun to oscillate, no further pulses are produced by the relaxation oscillator. This is because the transistor 21 will become conductive in the course of its second cycle of operation well before the capacitor 16 is charged to the critical value of voltage necessary to turn on the unijunction transistor 11. With transistor 21 conductive, capacitor 16 is discharged through the emitter-collector circuit of transistor 21 and therefore it can never build up sufficient voltage to cause transistor 11 to conduct. In the case of a temporary short circuit condition which inhibits oscillation of the converter, pulsing of the emitter-base circuit of transistor 21 continues. Nevertheless, the average power dissipation in the transistor 21 will remain at a relatively low value well within its operating limits because of the relatively brief duration of the starting pulses.

Although the starting device according to the present invention has been described in connection with one particular type of converter circuit, it will be apparent to those skilled in the art that its utility extends to multivibrator circuits of various types. Similarly, it will be recognized that the principle of the invention can be applied to other forms of oscillator circuits for producing starting pulses. Therefore the invention should not be deemed to be limited to the details of what has been described herein by way of example but rather it should be deemed to be limited only by the scope of the appended claim.

What is claimed is:

In a multivibrator power converter including first and second transistors having emitter-collector circuits and emitter base circuits, and a saturable transformer having winding means to intercouple the emitter-base circuits with the emitter-collector circuits, the combination with said converter of a relaxation oscillator formed with a unijunction transistor having an emitter-electrode and first and second base electrodes, means to connect the first base electrode of said unijunction transistor to the collector electrode of said first transistor, means to connect the second base electrode of said unijunction transistor to the base electrode of said first transistor, and a capacitor connecting the emitter electrode of said unijunction transistor to the emitter electrode of said first transistor.

References Cited by the Examiner

UNITED STATES PATENTS

| | | | |
|---|---|---|---|
| 2,922,958 | 1/1960 | Dean | 331—113 |
| 3,085,211 | 4/1963 | Jensen et al. | 331—52 |
| 3,176,242 | 3/1965 | Dyer et al. | 331—113 |

ROY LAKE, *Primary Examiner.*

S. H. GRIMM, *Assistant Examiner.*